United States Patent Office 3,443,544
Patented May 13, 1969

3,443,544
SHAPE OF SHIP'S BOW
Vladimir Nikolaevich Begizov, Ul. Frunze 9, kv. 14,
Leningrad, U.S.S.R.
Filed July 13, 1967, Ser. No. 653,186
Int. Cl. B63b *1/00*
U.S. Cl. 114—56                            4 Claims

ABSTRACT OF THE DISCLOSURE

A bow of a ship having a curvature in transverse planes perpendicular to the center plane of the ship, which is concave inwardly above the load water line and convex outwardly below the ballast water line with a smooth curve reversal portion therebetween, the minimum ordinates of the concave portions being above the wave crest line of the bow, said bow having a curvature in planes parallel to the center plane of the ship which is concave rearwardly above the load water line and convex forwardly therebelow with a smooth curve reversal portion between the load water line and the ballast water line.

---

Figure 1:
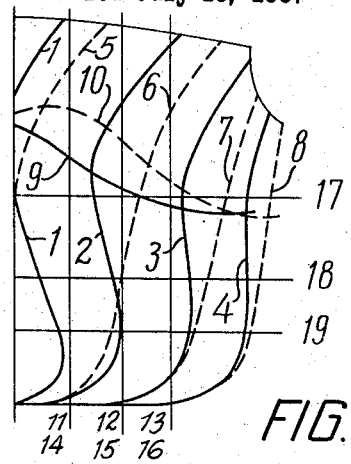

The present invention relates to shipbuilding and, more particularly, to the shape of the bows of ships, mainly with a bulb bow.

Known in the art are the shapes of a bulb bow, whose lines are such that the maximum concavity of frames is due to be lower than the top of a bow wave crest, while provided on the frames close to the load waterline or below the latter is a break, or an edge, which is the beginning of a wave bed (cf. the Italian Patent No. 593,933, Cl. B63, 1958).

With a bow of such shape, a marked decrease in the angle of entrance of the load waterline, as compared with the similar angles of the load waterline of a normally lined bow, brings about a certain decrease in the resistance of water to the headway of a fully laden ship. As for the waterlines which are lower than the load line, they remain invariable and, as a result, the resistance of water to the headway of a partially laden ship is virtually the same as in the case of a normally lined bow.

Also used in practice are bows formed by a spherical head-piece arranged over the normal lines (cf. Report No. 71, 1965, by Van Lammeren, published by the Netherlands Shipbuilding and Shipment Research Center).

With a bow of such shape, the resistance of water to the headway of ship in ballast is reduced appreciably owing to a favorable interference, said resistance remaining virtually invariable in the case of a fully laden ship.

It is an object of the present invention to eliminate these disadvantages by providing such a shape of the bow which sharply reduces the resistance of water to the ship's headway within a wide range of draught (from heavy load to light load).

According to the invention, this is achieved by making the bow frames concave toward the center line of a ship near and above the load waterline. The minimum ordinates of the concave frames are arranged not lower than the top of the bow wave crest, while the frame portions in-between the load and light waterlines are smoothly conjugated with convex sections of the frames below the light waterline (the X-axis is in the center line and perpendicular to the keel).

In an exemplary embodiment of the invention it is contemplated, according to the invention, to arrange the branches of the bow waterlines lying in-between the load and light waterlines stemwise so that they meet thereon at a sharp angle, the branches of the waterlines below the light waterline forming elliptical sections.

It is reasonable that the stem topside above the load waterline be deflected from the neutral frame toward a midship at least up to the level of the bow wave crest and smoothly transforms into the cutwater bottom which is fully brought out of the neutral frame, the point of the stem's crossing with the neutral frame being at one level with the load waterline.

A model of a large-tonnage tanker with a bow shape fashioned according to the present invention was constructed and towage test helped to establish a 15 to 20% reduction in the resistance of water ensured by the above-said model as compared with that of a similar-type model of a tanker with conventional bow lines, either fully laden or in ballast.

Figure 2:
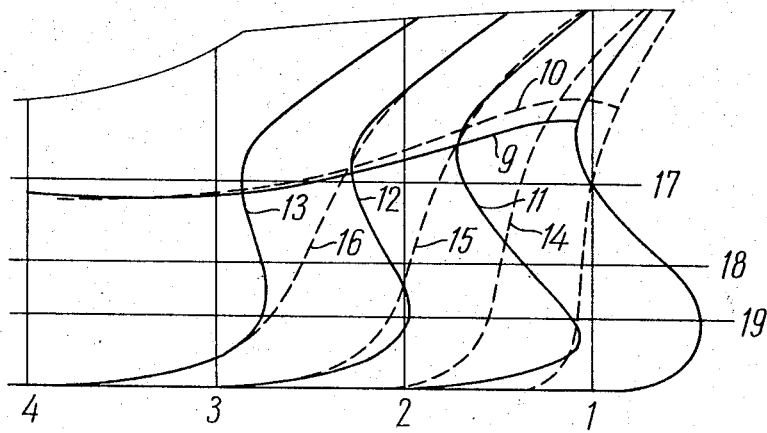

Appended hereto is a drawing of an exemplary embodiment of the shape of the ship bow lines, wherein:

FIG. 1 is a first view of a bow body;
FIG. 2 is a side view of the bow body; and
FIG. 3 is a plain view of half the bow body.

In the three figures of the drawing, according to the invention, the bow lines and the profile of the bow wave crest are indicated by continuous lines, while dotted lines indicate the lines and the profile of the bow wave crest of a ship with a normal bow shape.

Figure 3:
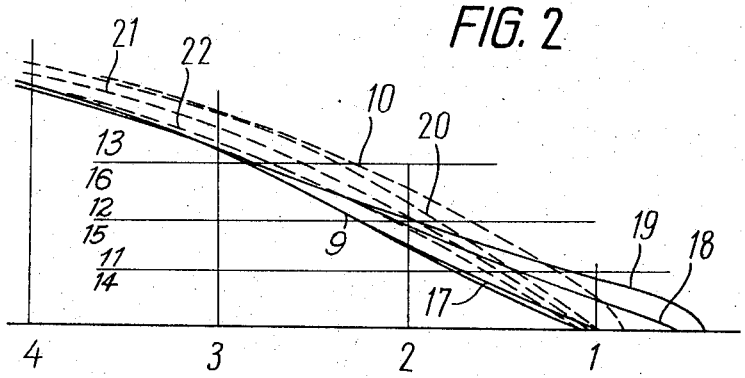

Lines 1, 2, 3 and 4 of FIGS. 1, 2 and 3 indicate bow frames according to the invention; said frames are concave toward the center line so that their minimum ordinates are not lower than the top of the bow wave crest; dotted lines 5, 6, 7 and 8 indicate the frames of a ship with conventional bow lines; line 9 corresponds to a wave crest which is formed, at a certain speed, at the bow of a ship having the lines according to the invention; dotted line 10 indicates a wave crest formed by the bow of a ship with conventional lines at a speed same with that of the ship with the bow lines according to the invention.

In FIG. 2, lines 11, 12 and 13 indicate bow-and-buttock lines of the ship according to the invention; dotted lines 14, 15 and 16 indicate bow-and-buttock lines of a ship with conventional lines.

In FIGS. 1, 2 and 3, lines 17, 18 and 19 are the waterlines of the bow plan of a ship according to the invention, wherein waterline 17 corresponds to the load draught, waterline 18—to light draught and waterline 19 corresponds to ballast water line.

In FIG. 3, dotted lines 20, 21 and 22 indicate the waterlines of ships with conventional lines, which coincide in height with the corresponding waterlines of ships according to the invention.

I claim:

1. A bow of a ship having a curvature, in transverse planes perpendicular to the center plane of the ship, concave inwardly above the load water line and convex outwardly below the ballast water line with a smooth curve reversal portion therebetween, said bow forming a wave crest line wherein the minimum ordinates of the concave portions are above the wave crest line, said bow having a curvature, in planes parallel to the center plane of the ship, concave rearwardly above the load water line and convex forwardly therebelow with a smooth curve reversal portion therebetween.

2. A bow as claimed in claim 1 wherein the curvature of the bow in water line planes between the load water line and ballast water line is such that a sharp angle is formed at the stem whereas below the ballast water line the shape of the bow is elliptical.

3. A bow as claimed in claim 1 having a stem which above the load water line and below the wave crest line is displaced rearwardly relative to a vertical plane passing through the intersection of the load water line and the stem, said stem having a point of change of curvature which is at said load water line.

4. A bow as claimed in claim 1 wherein said bow in planes parallel to the center plane of the ship has respective shapes in which the portion between the load water line and the wave crest line is displaced rearwardly with respect to a vertical plane passing through the intersection of such shape and the load water line whereas above the wave crest line the shape is displaced forwardly of such plane.

References Cited

UNITED STATES PATENTS

| | | | |
|---|---|---|---|
| 3,180,299 | 4/1965 | Takao Inui | 114—56 |
| 3,306,243 | 2/1967 | Gray et al. | 114—56 |
| 3,306,244 | 2/1967 | Schneekluth et al. | 114—56 |
| 3,362,369 | 1/1968 | Taniguchi | 114—56 |

ANDREW H. FARRELL, *Primary Examiner.*